(12) United States Patent
Neely (10) Patent No.: US 9,509,719 B2
(45) Date of Patent: Nov. 29, 2016

(54) SELF-PROVISIONING ACCESS CONTROL

(71) Applicant: RedCloud Security Inc., Sterling, VA (US)

(72) Inventor: E. Terry Neely, Reston, VA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 165 days.

(21) Appl. No.: 13/855,543

(22) Filed: Apr. 2, 2013

(65) Prior Publication Data
US 2014/0298398 A1    Oct. 2, 2014

(51) Int. Cl.
*H04L 29/06* (2006.01)

(52) U.S. Cl.
CPC .............. *H04L 63/20* (2013.01); *H04L 63/10* (2013.01)

(58) Field of Classification Search
CPC ... G06F 21/62; G06F 21/552; H04L 63/102; H04L 63/20
USPC ......................................... 726/1; 713/1, 182
See application file for complete search history.

(56) References Cited

U.S. PATENT DOCUMENTS

| | | |
|---|---|---|
| 6,390,697 B1 | 5/2002 | O'Mara et al. |
| 7,437,755 B2 | 10/2008 | Farino et al. |
| 7,586,413 B2 | 9/2009 | Davis |
| 7,706,778 B2 | 4/2010 | Lowe |
| 7,822,989 B2 | 10/2010 | Libin et al. |
| 8,009,013 B1 | 8/2011 | Hirschfield et al. |
| 8,015,597 B2 | 9/2011 | Libin et al. |
| 8,074,271 B2 | 12/2011 | Davis et al. |
| 8,150,374 B2 | 4/2012 | Lowe |
| 8,164,447 B2 | 4/2012 | Wittke |
| 8,171,524 B2 | 5/2012 | Micali et al. |
| 8,183,980 B2 | 5/2012 | Davis et al. |
| 8,232,862 B2 | 7/2012 | Lowe |
| 8,232,879 B2 | 7/2012 | Davis |
| 8,261,319 B2 | 9/2012 | Libin et al. |
| 8,358,783 B2 | 1/2013 | Davis et al. |
| 8,381,556 B2 | 2/2013 | Gilbert |
| 8,427,320 B2 | 4/2013 | Davis |

(Continued)

FOREIGN PATENT DOCUMENTS

| | | |
|---|---|---|
| WO | WO 03/063038 A2 | 7/2003 |
| WO | WO 2012/058450 A1 | 5/2012 |
| WO | WO 2012/098343 A1 | 7/2012 |

OTHER PUBLICATIONS

Hjorth, "Trusted Domain: A Security Platform for Home Automation", Jul. 2012, Computers and Security, p. 940-955.*

(Continued)

*Primary Examiner* — Thanhnga B Truong
*Assistant Examiner* — Gregory Lane
(74) *Attorney, Agent, or Firm* — Baker & Hostetler LLP (57) ABSTRACT

A processor-implemented access control method includes receiving credential and policy directory information to configure an access controller to allow self-provisioning of the access controller through periodic, automated query of the directory by the access controller; acquiring from the directory, credential and policy information for one or more individuals who may require access; storing in a local cache the acquired credential and policy information; receiving an access request to allow an individual access; comparing the access request to the credential and policy information in the cache; and when the comparison indicates a match, granting the individual access.

25 Claims, 9 Drawing Sheets

(56) References Cited

U.S. PATENT DOCUMENTS

| | | |
|---|---|---|
| 8,543,684 B2 | 9/2013 | Hulusi et al. |
| 8,578,472 B2 | 11/2013 | Davis et al. |
| 2002/0077986 A1 | 6/2002 | Kobata et al. |
| 2002/0112155 A1 | 8/2002 | Martherus et al. |
| 2003/0115243 A1* | 6/2003 | Smith .................. G06F 9/5044 718/104 |
| 2003/0200442 A1* | 10/2003 | Bhat et al. .................... 713/182 |
| 2003/0221101 A1 | 11/2003 | Micali |
| 2004/0049675 A1 | 3/2004 | Micali et al. |
| 2005/0010783 A1 | 1/2005 | Libin et al. |
| 2005/0021661 A1* | 1/2005 | Duloutre et al. ............. 709/217 |
| 2005/0033962 A1 | 2/2005 | Libin et al. |
| 2005/0044376 A1 | 2/2005 | Libin et al. |
| 2005/0044386 A1 | 2/2005 | Libin et al. |
| 2005/0044402 A1 | 2/2005 | Libin et al. |
| 2008/0077989 A1 | 3/2008 | Bardsley et al. |
| 2008/0086546 A1* | 4/2008 | Lu et al. ...................... 709/220 |
| 2009/0070571 A1* | 3/2009 | Neely ............................... 713/1 |
| 2012/0159572 A1* | 6/2012 | Patel et al. ........................ 726/3 |
| 2012/0297461 A1 | 11/2012 | Pineau |
| 2013/0047207 A1* | 2/2013 | Radhakrishnan .................. 726/1 |
| 2013/0207773 A1* | 8/2013 | Hathaway et al. .......... 340/3.43 |
| 2014/0020056 A1 | 1/2014 | Hoesl |

OTHER PUBLICATIONS www.crunchbase.com/company/corestreet; CrunchBase; 2009; accessed Feb. 26, 2014; 2 pages.

Bowman; "CoreStreet's Distibuted Certification Validation"; CoreStreet, Ltd; 2004; 32 pages.

www.hidglobal.com/identity-assurance; ActivID IT Security Solutions; HID; accessed Feb. 26, 2014.

International Application No. PCT/US2014/26177; Int'l Preliminary Report on Patentability; dated Apr. 13, 2015; 25 pages.

* cited by examiner

SELF-PROVISIONING ACCESS CONTROL

BACKGROUND

Access control systems may limit entry into enclosed areas such as buildings, rooms within buildings, or fenced-in regions to only those who have permission to enter. Current access control systems include access card readers at building entry points (i.e., doors). Individuals who have permission to enter the building are provided an access control card that can be read by the access card readers. An access card reader obtains information from the access card and communicates the information to a control panel. The control panel determines whether the door should be unlocked. If the door should be unlocked (i.e., the access card is associated with an individual who has permission to enter), the control panel sends a signal to a door locking mechanism causing the mechanism to unlock.

SUMMARY

A processor-implemented access control method for controlling access to an enclosed area includes receiving credential and policy directory information to configure an access controller to allow self-provisioning of the access controller through periodic, automated query of the directory by the access controller; acquiring from the directory credential and policy information for one or more individuals who may require access to the enclosed area; storing in a local cache the acquired credential and policy information; receiving an access request to allow an individual access the enclosed area; comparing the access request to the credential and policy information in the cache; and, when the comparison indicates a match, granting the individual access to the enclosed area.

A system for controlling access by individuals to an area includes a processor and an access controller embodied on a computer-readable storage medium, the access controller including machine instructions that when executed by the processor causes the processor to configure the access controller to receive: credential and policy directory information from a remote directory, to allow self-provisioning of the access controller through periodic, automated query of the directory by the access controller; and credential and policy information from the directory for one or more individuals who may require access to the area, store in a local cache, the received acquired credential and policy information of the directory and the credential and policy information of the one or more individuals, receive an access request to allow an individual access to the enclosed area; compare the access request to the credential and policy information in the cache; and when the comparison indicates a match, grant the individual access to the enclosed area.

A processor-implemented method for configuring an access controller to control access by an individual to an asset includes receiving a credentials and policy directory address from which the processor obtains credential and policy information for individuals requiring access to the asset; receiving a destination address for the credential and policy information; establishing a periodicity for acquiring the credential and policy information; acquiring the credential and policy information for individuals requiring access to the asset; and automatically updating the credential and policy information for individuals requiring access to the asset at the established periodicity.

A self-provisioning/self-reporting access controller includes means for storing machine instructions for controlling access to an asset, and means for executing the machine instructions. The means for executing includes means for self-provisioning the means for executing the machine instructions, means for granting/denying access to the asset, and means for reporting events related to the granting and denying of access to the asset.

DESCRIPTION OF THE DRAWINGS

The detailed description refers to the following figures in which like numerals refer to like items, and in which.

DETAILED DESCRIPTION

Ensuring that only authorized individuals access protected or secured areas may be crucially important (e.g., at an airport, a military installation, office building etc.). Protected or secured areas may be defined by physical doors (for example, doors through which a human may enter) and walls, or may be virtually defined in other ways. For instance, a protected area may be defined as one in which unauthorized entry causes a detector to signal intrusion and possibly send a signal or sound an alarm if authorization is not provided.

Access control systems may limit entry into protected or secured areas of buildings, rooms within buildings, or fenced-in regions, or assets and resources therein, to only those individuals who have permission to enter.

Thus, an access control system, fundamentally, should identify the individual attempting to enter the secured area or access the assets and verify the individual is currently authorized entry or access. The herein disclosed access control systems, devices, and methods may encompass any access technology, including:

(1) using PINs and passwords that can be entered at a key pad associated with the access point (e.g., a door);

(2) using biometrics that can be entered by individuals via special readers associated with the door;

(3) using traditional signatures, provided by the individuals via a special pad associated with the door;

(4) using smart cards or contactless cards (e.g., sending a PIN to the door via a special reader/receiver);

(5) using a digital certificate; e.g., one stored in a smart card, contactless card or a wireless device, that can "communicate to the door" via a card reader or other receiver; and (6) using a physical key inserted into a door lock; such a key/lock mechanism may include a special encoding on the key that is read in the lock.

The above list of access technologies is not meant to be exhaustive. Furthermore, some facilities may use combinations of these technologies. The technologies may be used in any environment, including in government facilities, private businesses, public facilities, and in an individual's home.

As a further explanation of some of the above access technologies, some current access control systems use doors equipped with an entry device such as a key pad, through which an individual enters a PIN or password. The key pad has an attached memory or elementary processor in which a list of valid PINs/passwords is stored, so that the PIN/password may be checked to determine whether it still is valid. If the PIN/password is valid, the door opens; otherwise the door remains locked. Such elementary access control mechanisms offer minimum security. For example, a terminated employee may no longer be authorized to go through a door; however, a terminated employee who remembers his PIN still may be able to open the door. Therefore, it would be necessary to "deprogram" the PIN of terminated employees. Such a procedure, however, may be very cumbersome and costly: a facility may have hundreds of doors, and deprograming all such doors whenever an employee leaves or is terminated may be impractical.

Some current card-based access control systems use radio frequency identification (RFID) technology. The access card reader includes an RFID transceiver, and the access card includes an RFID tag or transponder. The RFID transceiver transmits a radio frequency (RF) query to the card as the card passes over RFID transceiver. The RF transponder includes a silicon chip and an antenna that enables the card to receive and respond to the RF query. The response is typically an RF signal that includes a pre-programmed identification (ID) number. The card reader receives the signal and transmits the ID number to a control panel using a wired or wireless connection. Current card readers may perform some basic formatting of the identification data prior to sending the data to the control panel, but generally are unable to perform higher level functions.

Current access controllers rely on proprietary protocols and software to provision/de-provision credentials, provide configuration information, and report transactions. The proprietary nature of these current access controllers limits a customer's options with respect to implementing changes, adding new features, and generally moving to other technology solutions once a specific manufacturer's products have been selected and installed. As access controllers move away from RS232/485 communications and onto a TCP/IP network communication medium, proprietary protocols are much less acceptable by the customer.

Furthermore, as physical security systems increase their reliance of an organization's information technology (IT) infrastructure, IT departments may look for options for reducing costs and time to deploy. This requires systems to follow standards both in installation and communications. The additional benefit provides interoperability between logical and physical security systems using standards and commercial off the shelf products.

To overcome these and other problems endemic in current access control systems, disclosed here are self-provisioning access controllers and related access control systems, and methods of their use. The herein disclosed access controllers, systems, and methods may be used for controlling physical access to buildings, structures, and areas. The herein disclosed access controllers, systems, and methods provide distributed access control policies, procedures, and credentials on a computer network while using an existing information technology (IT) infrastructure.

In addition to provisioning/de-provisioning access to assets such as physical areas, the access controllers, systems and methods disclosed herein also may provision a user/credential identity store with logical privileges to provide access to logical assets or resources such as files, computing resources, or other computing systems. Furthermore, access to the logical assets or resources may vary depending on the physical location of the individual requesting such access.

The access controllers, control systems, and control methods are described below with reference to the following terms:

Access controller—a device programmed, or the program itself, to make access decisions based on a cached database supplied by an identity store. Access requests are made via a sensing device (card reader, push button, etc.); authorization is checked either locally or by referring to a remote identity store for processing. If an access request is approved, output and input devices/systems (e.g., entry doors) are manipulated to allow access.

Door controller—a device in communication with the access controller and physically (e.g., wired or wireless) attached to a credential reader and associated input and output hardware. The door controller sends changes of state and credential reads to the access controller, waits for an authorization response from the access controller, and commands attached input, output and credential readers according to the authorization response.

Browser—a software program or firmware used to access and display Internet Web pages; current browsers include Internet Explorer, Google Chrome, Mozilla Firefox, and Apple Safari.

Identity store (or directory)—a database including relational, hierarchical, networked or other architectures that includes authorization and authentication data for individuals, credentials, resources, and group memberships. The identity store may reside at a facility owned and operated by an entity different from the entity owning and/or operating the protected area.

Event aggregation—the ability of the access controller to store and forward, to multiple systems, events that occur or are generated in the course of operating the access controller.

In an embodiment, the access controller is a software application capable of executing on a commercial off the shelf computer running, for example, the Linux operating system. The computer may be designed for desktop, rack mountable, cloud based or an embedded platform such as an access controller. The computer provides the necessary processor, storage and connectivity for the software application. All required software is loaded onto the computer without requiring any installation of software onto any other computer system.

The access controller provides an improved way to maintain credentials and associated access privileges and to transmit in real time events using an existing information technology (IT) infrastructure and databases without the need to access or otherwise use proprietary communication protocols.

The access controller, as a self-provisioning access device, may obtain and maintain a cached list of credentials and associated access privileges; these data allow the access controller to make on-the-spot, real-time access decisions without communication to any other access control system(s). The cache of credentials and associated access privileges may be acquired from one or more host systems periodically, including on a schedule, in real time, or as a complete snapshot. For example, the access controller may, in effect, continuously access a host system directory of access credentials and associated access privileges, and download some of all of the credentials and privileges. In an aspect, the access controller downloads these data for a select number of individuals. An individual for whom the data are downloaded may be uniquely identified, identified by group association, or identified by assigned roles(s).

The access controller may be used in either real-time, on demand, or on a schedule, to send real time events to a logging and monitoring device or system. In an aspect, an event may be an access door unlocking or locking, an access door open or closed signal (e.g., from a limit switch or position sensor, or based on a logic routine), an access door fault or unusual operation (open for a time exceeding a variable threshold), etc. The events may be sent in any number of formats, including XML, directly into a relational database or system logging facility of any number of remote devices or systems. If connectivity is lost, the access controller may buffer the events and may continue event transmission when connectivity is re-established.

The access controller may contain or provide a browser-accessible user interface. The interface provides an access control system operator the ability to configure any number of access points (e.g., doors) and their operation, and associated mapping to individuals and/or groups (on an individual basis, group basis, and/or defined role basis) to convey access privileges. With the same interface, the operator may configure the access controller to communicate with credential sources, including credential sources implemented in or using a relational database, a directory or hierarchical data store, or flat files such as comma-separated value (CSV) file, or any common ASCII file.

With the interface, the operator selects and configures a type of data synchronization including timed intervals, scheduled, on-demand, and real-time. The synchronization methods may include subscription, in which a host access credentials and policy system "pushes" information changes to the access controller; audit trail, in which the access controller requests information updates; or data modification triggers, in which code written into the host system detects information changes and sends the changed information to the access controller. The subscription method may require a persistent, always-on connection between the host system and the access controller while the other example two methods may use a transient connection.

The access controller initiates connection(s) to the sources and retrieves the credential and policy information to build the controller's local cache. Each individual may have a unique identifier to collate the individual's information from multiple sources into a single record. Once transferred to the local cache, the information may be used in access decisions as credentials are presented at access control points.

The access controller may log events, and the logs may be configured with the user interface to establish any number of devices, services, and systems as event recipients. The access controller may send the events to a remote monitoring service in any number of formats including, for example, SNMP, XML via direct socket connection (GSM, LAN, WAN, WiFi), Syslog, and through a serial port.

The access controller may be used to assign priorities to events. The event priorities may determine which events, and in what order, those events are sent to the remote monitoring service.

Figure 1A:
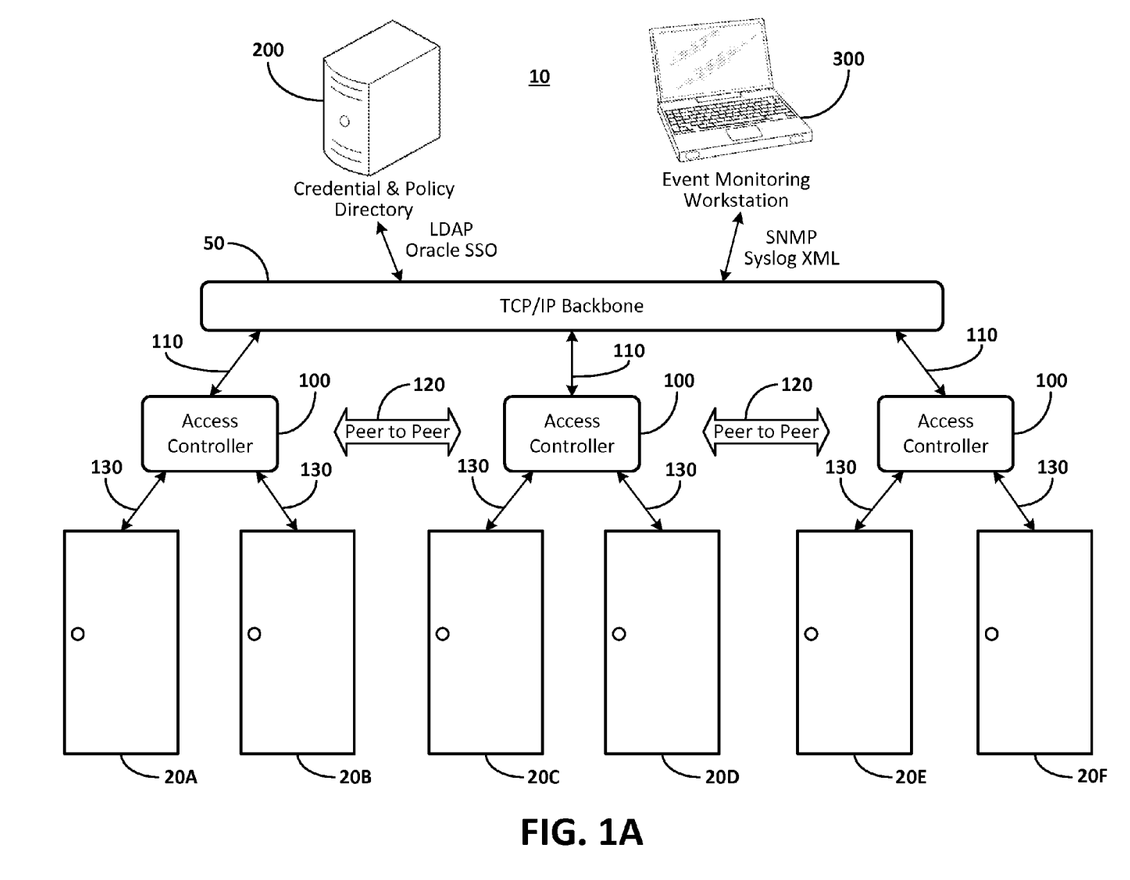
FIGS. 1A-1C illustrate an example access control system and select components thereof.
Figure 1B:
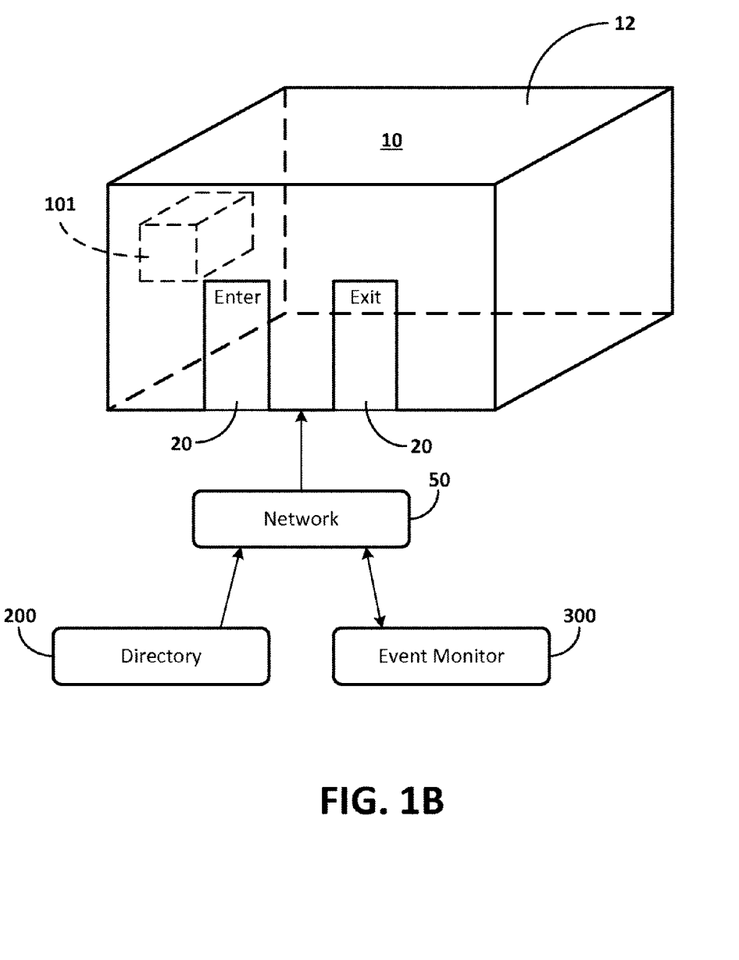
Figure 1C:
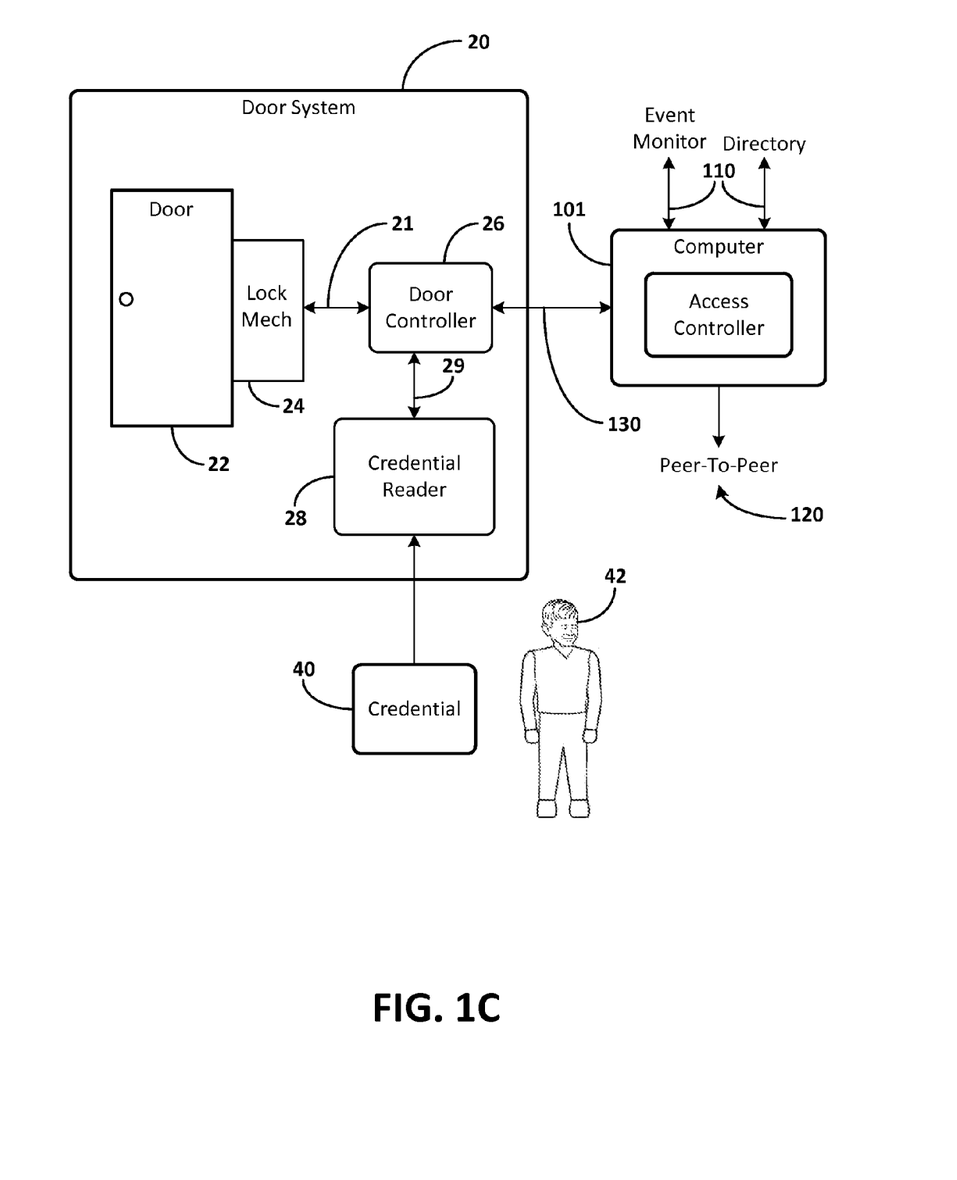

FIGS. 1A-C illustrate an example access control system and select components thereof. In FIG. 1A, access control system 10 includes door systems 20, access controllers 100, credential and policy directory 200 and event monitoring workstation 300, all of which are intended to limit or control access to an area or volume. The controllers 100 communicate 110 with the directory 200 and workstation 300 using, for example, TCP/IP backbone 50. The TCP/IP backbone 50 may be wired or wireless, or a combination of wired and wireless. The backbone 50 may include elements of a local area network (LAN) and a wide area network (WAN), including the Internet. Communications 110 between an access controller 100 and the directory 200, and between the controller 100 and the workstation 300 may be secure communications (e.g., HTTPS communications).

FIG. 1B illustrates selected components of the access system 10 to limit or control access by individuals to enclosed area 12. As shown, the enclosed area 12 is a six-sided structure with an entry door system 20 and an exit door system 20. The door systems 20 are described with reference to FIGS. 1A and 1C. The door systems 20 are intended for normal human access. Other access points (e.g., windows) may exist, and their operation may be monitored, alarmed, and controlled, but such access points are not described further herein.

The enclosed area 12 includes a computing platform 101 on which are implemented access control features that control, monitor, and report on operation of the door systems 20. The computing platform 101 may be fixed or mobile. The computing platform 101 is shown inside the enclosed area 12 but need not be. In executing its control, monitoring, and reporting functions, the computing platform 101 with its access control features may communicate external to the enclosed area 12 by way of network 50 with the (remote) directory 200 and with (remote) event monitoring workstation 300. The network 50 may be wired or wireless, and may provide for secure communications and signaling in addition to non-secure communications and signaling.

The enclosed area 12 may be a room in a building, the building itself, or any other structure. The enclosed area 12 is not limited to a six-sided configuration. The enclosed area 12 could be an open structure (e.g., a sports stadium), a fenced-in area (e.g., an area surrounding a runway), or an area having an "invisible" fence or "virtual walls." The enclosed area 12 may be geographically fixed (e.g., a building, a room in a building) or mobile (e.g., a trailer, airplane, ship, or container).

The enclosed area 12 may be used to control access to government or business-classified documents or devices contained therein, access to computer systems contained therein, access to individuals, access to valuable items such as rare paintings, jewelry, etc., and access to dangerous materials or systems The enclosed are 12 may be a safe or vault at a bank, a control room for a nuclear reactor, a hangar for a classified, new-technology airplane, or a passenger gate at an airport.

In a mobile configuration, the enclosed area 12 may be used, for example, in field operations to quickly establish a secure facility anywhere in the world. The security of such a mobile enclosed area 12 will be apparent from the discussion that follows. Moreover, the mobile enclosed area may be used for very different operations, with different individuals able to access the mobile enclosed area 12, depending on its intended use, by simple configurations changes implemented through a user interface, as described below. Thus, the system 10 provides not only high levels of security, access control, event monitoring and reporting, but also the flexibility to quickly adapt the mobile enclosed area 12 to any operation or mission, anywhere in the world, for which access control is desired.

Returning to FIG. 1A, the access controllers 100 also may communicate between and among themselves using peer-to-peer communications 120. Such peer-to-peer communications 120 may be enabled by use of a secure LAN, for example. Alternately, the peer-to-peer communications 120 may be wireless secure communications. The peer-to-peer communications 120 also may follow the TCP/IP protocol.

The peer-to-peer communications 120 allow an access controller 100 to send and receive access status information and events to and from the other access controllers used in the enclosed area 12. Thus, if a door system 20 is inoperative, its associated access controller 100 may provide this information to the other access controllers 100. The peer-to-peer communications 120 allow one access controller 100 to act as a parent (master) access controller and the remaining access controllers 100 to act as child (subservient) access controllers. In this aspect, information and configurations may be stored or implemented on the parent access controller and then may be replicated on the child access controllers.

Finally, the access controller 100 may communicate with the door systems 20 using wired or wireless secure communications 130.

The door systems 20, which are described in more detail with reference to FIG. 1B, control normal human access to an enclosed area 12. In the example of FIG. 1A, six door systems 20 are illustrated. In an aspect, the six door systems 20 provide three enclosed area access points, and the door systems 20 operate in pairs; one door system 20 of a pair allows entry into the enclosed area 12 and the other door system 20 of the pair allows egress from the enclosed area 12. In another aspect, a single door system 20 may be used for both entry to and egress from the enclosed area 12.

FIG. 1A shows each door system pair in communication with a separate access controller 100. However, other combinations of controllers 100 and door systems 20 may be implemented in the system 10. For example, a single controller 100 may control all door systems 20 for the enclosed area 12.

The credential & policy directory 200 shown in FIG. 1A may represent one or many actual directories. The directories may be located remotely from the enclosed area 12. The directories may be operated by entities other than the operator of the enclosed area 12. For example, the enclosed area 12 may be a sensitive compartmented information facility (SCIF) for a government contractor, and the directory 200 may represent a directory for the government contractor and a directory for a government agency.

A directory 200 may include identification information (name, age, physical characteristics, photograph) for individuals who may be allowed access to the enclosed area 12, the identification credentials of the individuals (PIN/password, RFID tag, certificate), and other information.

The event monitoring workstation 300 may be implemented by the same entity as that of the enclosed area 12. Alternately, the event monitoring workstation 300 may be implemented by and at an entity separate and apart from that of the enclosed area 12.

The event monitoring workstation 300 may receive event data from the access controllers 100.

FIG. 1C illustrates an example door system that may be implemented in the system of FIG. 1A. In FIG. 1C, door system 20 is shown in communication with access controller 100 over communication path 110. The door system 20 includes access door 22, door locking mechanism 24, door controller 26, and credential reader 28. The door 22 may be any door that allows individuals to enter or leave the enclosed area. The door 22 may include a position sensor (e.g., a limit switch—not shown) that indicates when the door 22 is not fully closed. The position sensor may send a not-fully-closed signal over signal path 21 to the door controller 26. The not-fully-closed signal may be sent continuously or periodically, and may not be sent until after a predefined time has expired.

The locking mechanism includes a remotely operated electro-mechanical locking element (not shown) such as a dead bolt that is positioned (locked or unlocked) in response to an electrical signal sent over signal path 21 from the door controller 26.

The door controller 26 receives credential information over signal path 29 from credential reader 28 and passes the information to the access controller 100 over signal path 130. The door controller 26 receives lock/unlock signals from access controller over signal path 130. The door controller 26 sends lock mechanism lock/unlock signals over signal path 21 to locking mechanism 24.

The credential reader 28 receives credential information 40 for an individual 42. The credential information 40 may be encoded in an RFID chip, a credential on a smart card, a PIN/password input using a key pad, biometric data such as fingerprint and retina scan data, for example.

The door system 20 operates based on access request signals sent to the access controller 100 and access authorization signals received, in response, from the access controller 100. The door system 20 may incorporate an auto lock feature that activates (locks) the door 22 within a specified time after the door 22 is opened and then shut, after an unlock signal has been sent to the locking mechanism 24 but the door 22 not opened within a specified time, or under other conditions. The auto lock logic may be implemented in the door controller 26 or the locking mechanism 24.

The door system 20 may send event signals to the event monitoring system 300 by way of the access controller 100. Such signals include door open, door closed, locking mechanism locked and locking mechanism unlocked. As noted above, the signals may originate from limit switches in the door system 20.

In an aspect, a door system 20 may be used only for entry and a separate door system 20 may be used only for egress.

However configured, the door systems 20 may indicate when an individual 42 is in the enclosed area 12 and when the individual 42 has exited the enclosed area 12, based on information obtained by reading credential information 40 of the individual 42 on entry and exit, respectively. These signals may be used to prevent reentry without an intervening exit, for example. The signals (or their absence) also may be used to prevent access to areas and systems within the enclosed area. For example, the individual 42 may not be allowed to log onto his computer in the enclosed area 12 in the absence of an entry signal originating from one of the door systems 20 of the enclosed area 12. Thus, the access controller and its implemented security functions may be a first step in a cascading series of access operations the individual may be exposed to.

The door systems 20 may incorporate various alarms such as for a propped open door 22, a stuck unlocked locking mechanism 24, and other indications of breach or fault.

FIGS. 1A-1C describe an access control system 10 primarily as applying to physical access to an area such as a building or a room in the building. However, the access control system 10, and select components thereof, as disclosed above, may be used to control access to an organization's assets and resources, including logical resources. For example, the self-provisioning access controller 100 may be used to control access to an organization's computer system and to the files (i.e., logical resources) contained on the computer system. Moreover, the access controller 100 may self-provision to provide individuals with staged access to the logical resources. For example, an individual may be allowed access to files 1-10 in a first enclosed area, and access to files 1-20 in a second, and more secure, enclosed area. In this example, the first enclosed area may be a building and the second enclosed area may be a SCIF within the building. Thus, the self-provisioning access controller 100 may establish very fine control over access privileges for individuals, including physical and logical access, and may adjust the logical access based on the physical location of the individual as indicated by a read of the individual's credentials.

Figure 2:
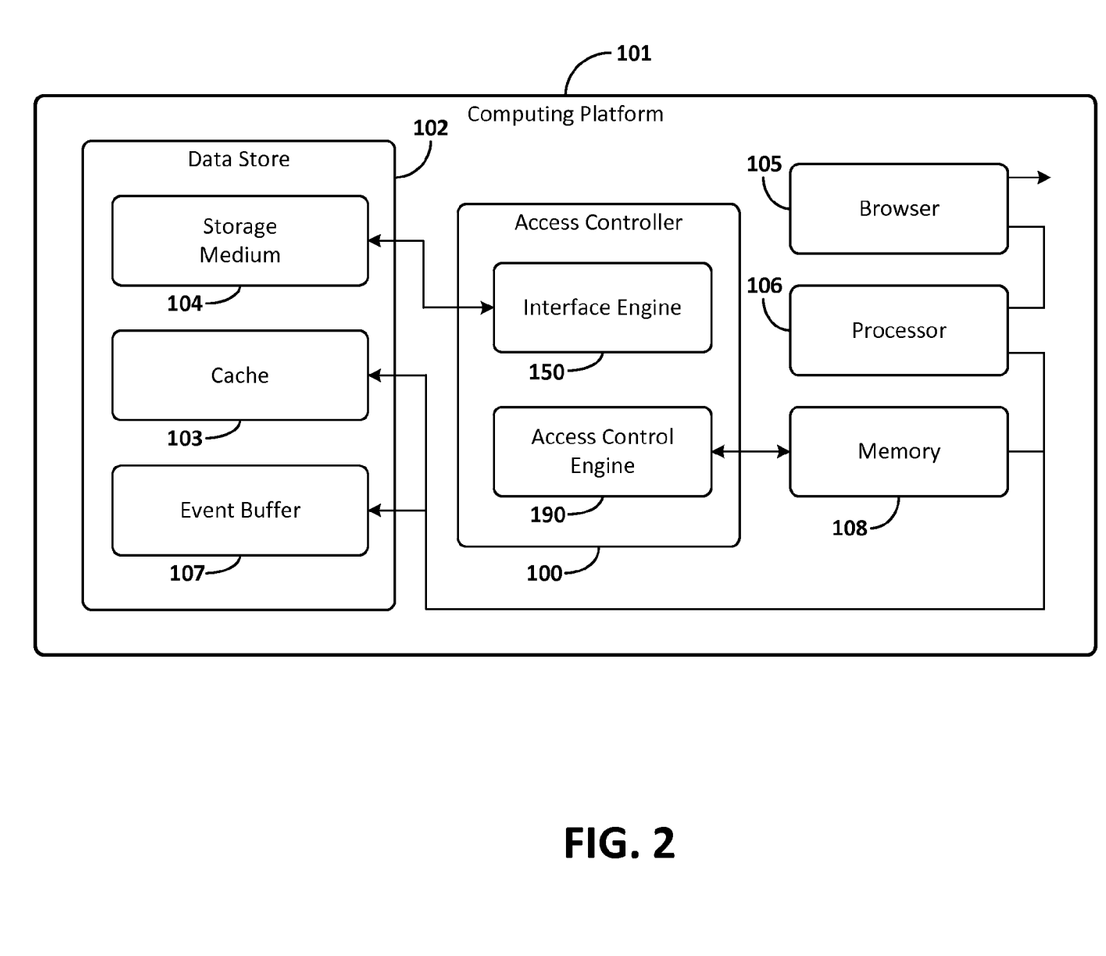
FIG. 2 illustrates elements and components of an example access controller used with the system of FIGS. 1A-1C.

FIG. 2 illustrates elements and components of an example access controller 100 used with the system 10 of FIGS. 1A-1C. In FIG. 2, access controller 100 is shown implemented on a computing platform 101. The computing platform 101 may be any computing device including a mainframe computer, a desktop computer, a laptop computer or tablet, and a smartphone, for example. The access controller 100 may be implemented as software, hardware, or firmware, or any combination of the three. When implemented in software, the access controller 100 may be stored in a non-transitory computer-readable storage medium.

The computing platform 101 may employ the Linux operating system. Alternately, other operating systems may be used. The computing platform 101 includes data store 102, which in turn includes local cache 103, which may be used to locally store credential and access policy information for individuals such as the individual 42, non-transitory computer-readable storage medium 104 on which may be stored the access controller 100, and event buffer 107, which may temporarily store events pending transmission to the event monitoring workstation 300. The computing platform further includes browser 105, processor 106, and memory 108. The processor 106 may load programs for execution, including the access controller 100, from the data store 102 into memory 108.

The access controller 100 communicates with local cache 103 and, using browser 105, directories such as the directory 200 and other computing devices such as the event monitoring workstation 300. However, communications with the directory 200 and workstation 300 may be by other means including over a dedicated, local area network.

The access controller 100 includes interface engine 150 and access control engine 190. The interface engine 150 provides user interface 160 (see FIG. 3), which may be employed by an operator (human) of the access control system 10 to establish self-provisioning features for and event reporting by the access controller 100, as described in detail with respect to FIG. 3.

The access control engine 190 includes logic to communicate with the directory 200 to self-provision the cache 103, to operate door systems 20 based on information contained in the self-provisioned cache 103. The access control engine 190 includes logic to log events and report the events to event monitor workstation 300. The logic may enable event aggregation where the access controller 100 stores and reports events to multiple destinations. The access control engine 190 is described in detail with respect to FIG. 4.

Figure 3:
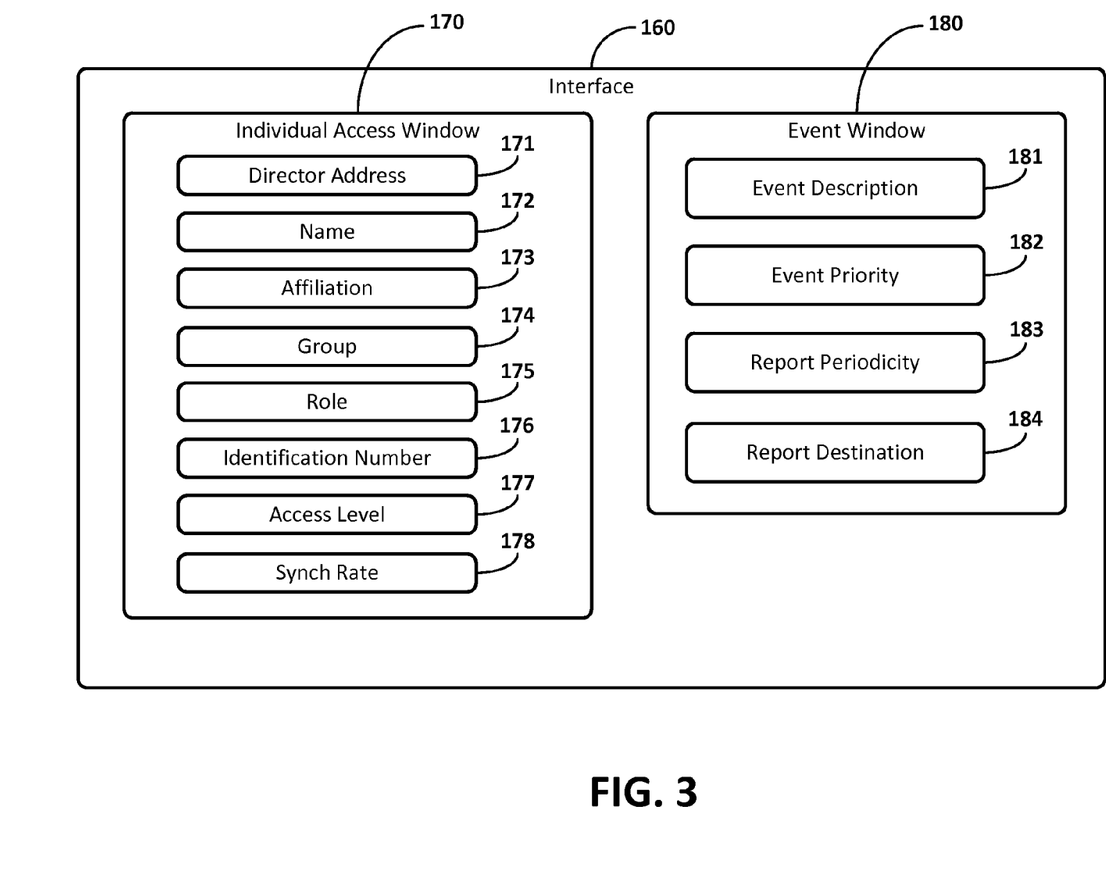
FIG. 3 illustrates an example interface enabled through the access controller of FIG. 2.

FIG. 3 illustrates an example user interface 160 enabled through the access controller 100 of FIG. 2. User interface 160 provides the operator the ability to configure and control the operation of any number of door systems 20 for the enclosed area 12. The user interface 160 allows the operator to create mappings of authorized individuals to groups and to convey access privileges based on individual identities, group memberships, and assigned roles within an organization. With the same interface 160, the operator may configure the access controller 100 to communicate with credential sources, such as the directory 200, including any relational database, directory or hierarchical data store, or with flat files such as CSV or any common ASCII file.

As shown in FIG. 3, the example user interface 160 includes access window 170 for information related to individuals, and event window 180 for information related to events. Individual access window 170 includes directory address window 171, in which the operator enters the address (e.g., a URL) of the directory 200; individual name window 172, in which an individual's name may be entered or may be listed in a pull-down menu; an affiliation window 173 in which the individual's organization may be entered; a group window 174 in which groups to which the individual belongs may be entered; role window 175 in which roles or tasks assigned to the individual may be entered; an identification number window 176 in which an assigned, unique identification appears; an access level window 177, which lists the highest level of access of the individual; and a synchronization window 178 in which a periodicity for updating the individuals' access data by reference to the credential and policy directory 200 may be specified. Some of the windows 171-178 may be in the form of pull-down menus. Some windows, such as the synchronization window 178 may be displayed once and its selected value applied to all individuals. The windows 171-178 may appear in the operator's display one at a time. Once the data are entered, the operator may be presented with a confirmation page to confirm the selections. Not all windows need to filled out; in one aspect, the operator may provide the directory address and the individuals' names, and the remaining data are retrieved by the access controller from the directory 200. Moreover, the access controller 100 may retrieve or refresh the data by reference to the directory 200 on a periodic basis, which may be near to real-time or continuous referral. Alternately, the data may be retrieved at longer intervals, on a schedule, or on-demand, for example. Thus, the access controller 100 is able to self-provision itself with access control information for individuals who may require access to the enclosed area 12. As noted above, the retrieved data may be stored in local cache 103, and the access controller 100 refers to the local cache 103 when making access decisions.

The event window 180 provides a number of data entry windows, which may further include pull-down menus, and which a system operator may use to establish an initial configuration of the access controller 100 for reporting event to the event monitoring workstation 300. The event window 180 includes event description window 181 in which event names or titles, brief description, measurement parameters, and other information may be entered. For example, the event window 180 may be used to specify a door open event, the identity of the device providing the door open measurement, what a door open event means, and the form in which the door open event is provided.

The event window 180 further includes an event priority window 182 in which the system operator is able to assign priorities to events. The priorities may determine the order in which events are sent from the access controller 100 to the event monitoring workstation 300. Thus, for example, an event indicative of an alarm or fault may have a higher priority than a door open event.

Still further, the event window 180 includes a report periodicity window 183 in which the system operator sets a time frame for reporting events to the event monitoring workstation 300.

Finally, the event window 180 includes report destination window 184 in which the system operator enters the address of the event monitoring workstation 300. Using the window 184, the system operator is able to designate many different entities to receive event reports. Different entities may receive different reports. For example, a first event monitoring workstation may receive only door open and door close events while a second event monitoring workstation may receive all events. The designated destinations need not belong to the same entity.

Figure 4:
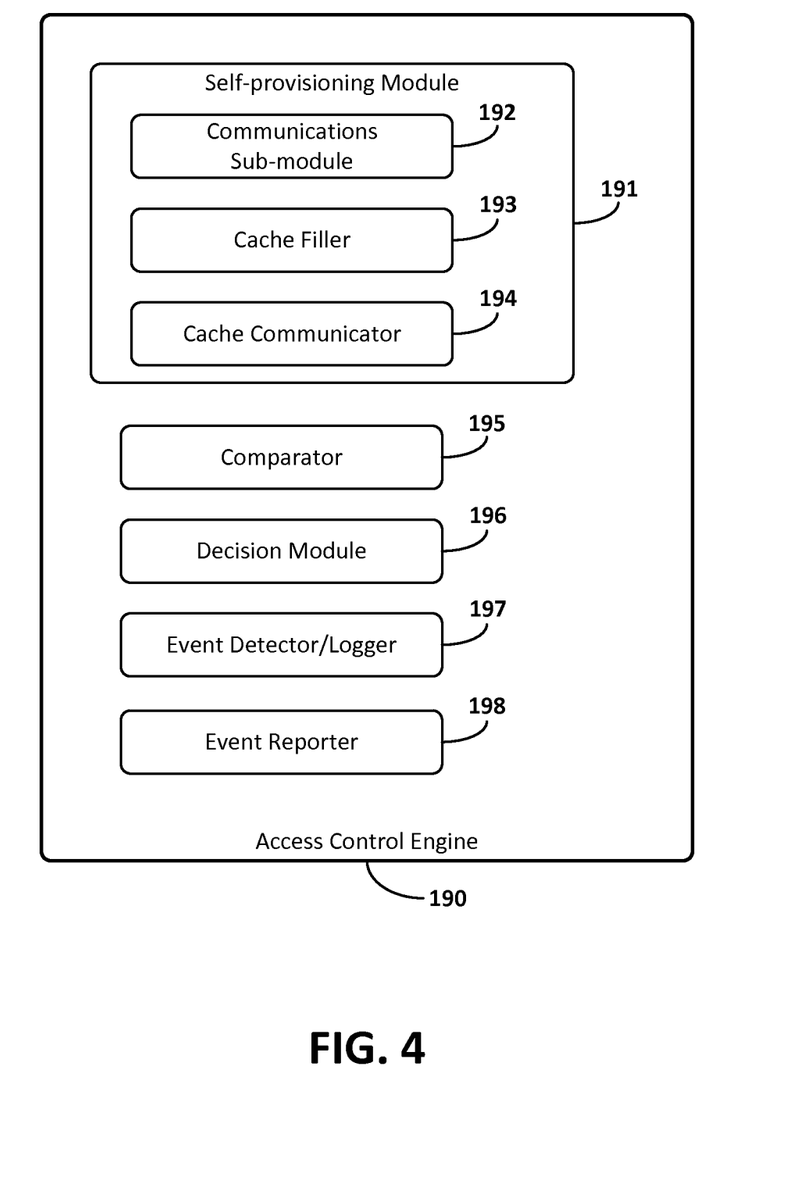
FIG. 4 illustrates an example access control engine of the access controller of FIG. 2.

FIG. 4 illustrates an example of the access engine 190 in the access controller 100. The access engine 190 includes self-provisioning module 191, comparator 195, decision module 196, event detector/logger 197, and event reporter 198.

In an embodiment in which the system 10 includes many access controllers 100, one access controller 100 may be designated as a parent access controller and the other access controllers may be designated as child access controllers. The master access controller may acquire data from the directory 200 and then, using peer-to-peer communications 120, copy the acquired data to the child access controllers. Alternately, each access controller 100 may separately communicate with the directory 200.

As noted above, one aspect of the herein disclosed access control systems, devices, and methods is the ability of the access controller 100 to self-provision with access control information acquired from a credentials and policy directory 200, which may be located remotely from the access controller 100 and may be owned and operated by an entity other than the entity that owns and operates the access controller 100. The self-provisioning module 191 provides for some of the self-provisioning functionality. The self-provisioning module 191 includes communications sub-module 192, cache filler 193, and cache communicator 194. The communications sub-module 192 determines which of possibly multiple directories 200, the access controller 100 should address to acquire and update credentials and policy information. The sub-module 192 then establishes secure (encrypted; e.g., HTTPS) communications with the selected directory 200 and acquires the information. Alternately, some information may be acquired using non-secure (unencrypted) communications.

The communications sub-module 192 also may establish secure (or non-secure) communications with the event monitoring workstation 300 to send event information in real-time, near real-time (e.g., within a few seconds of the event), on a schedule, on demand from the event monitoring workstation 300, or on some other basis.

The communications between the communications sub-module 192 and the directory 200 and the event monitoring workstation 300 may be made by way of browser 105. The communications sub-module 192 may perform data encryption (for outgoing requests/reports) and decryption (for data packets received from the directory 200 or requests received from the event monitoring workstation 300).

The cache filler 193 receives the acquired information from the communications sub-module 192 and populates the local cache 103 accordingly. The cache filer 192 may run error checks on the received information prior to storing the information in the cache 103.

The cache communicator 194 may retrieve data from the cache 103 for use in other components of the access control engine 190 such as, for example, to determine whether to unlock a door 22 to grant access to a specific individual listed in the cache 103. The cache communicator 104 may include a search/display feature that allows the system operator to search the cache and receive a report (display) of some or all of the cache contents. The report may be provided in the interface 160 and may be printed.

The comparator 195 receives credential information acquired at the door systems 20 and communicates with the cache communicator 194 to retrieve the appropriate information from the cache 103. The acquired credential information and retrieved information are provided to the decision module 196, which determines if the information matches (sufficiently) so as to permit an individual access to the enclosed area 12.

The event detector/logger 197 receives signals from the door systems 20, classifies the signals according to a predefined event, formats the data as a reportable event, and logs the event in event buffer 107. The event reporter 198 then reports the logged events to the event monitoring workstation 300 by way of the communications sub-module 192 and browser 105.

Figure 5A:
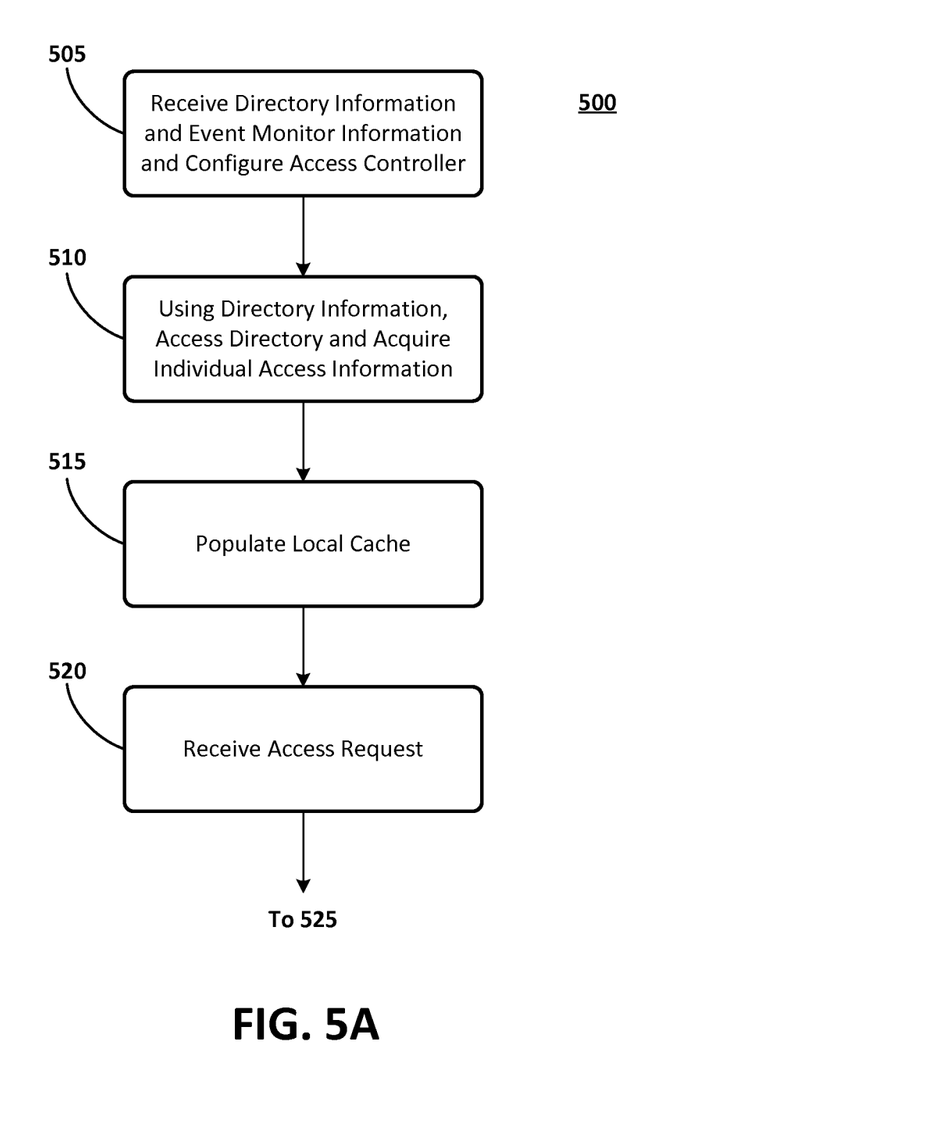
FIGS. 5A-5C are flowcharts illustrating example methods of the system of FIGS. 1A-1C and the access controller of FIG. 2.
Figure 5B:
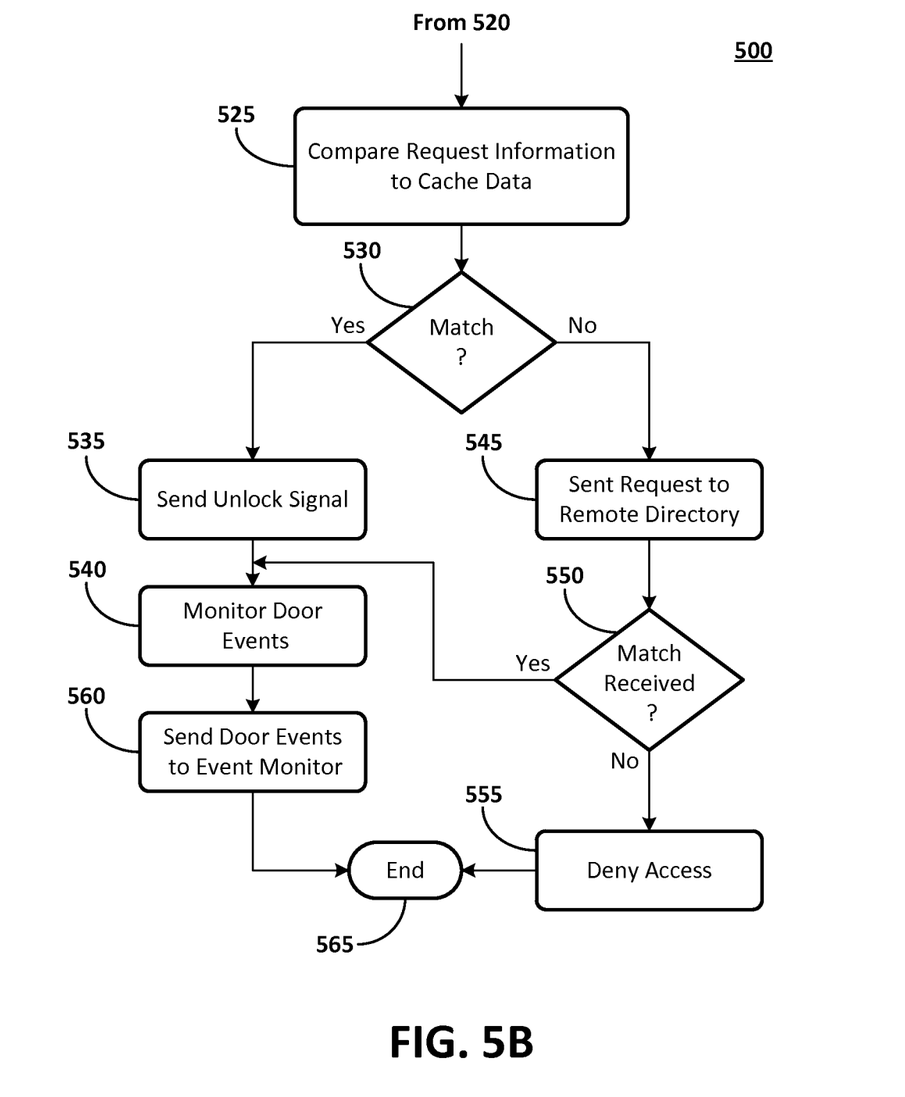
Figure 5C:
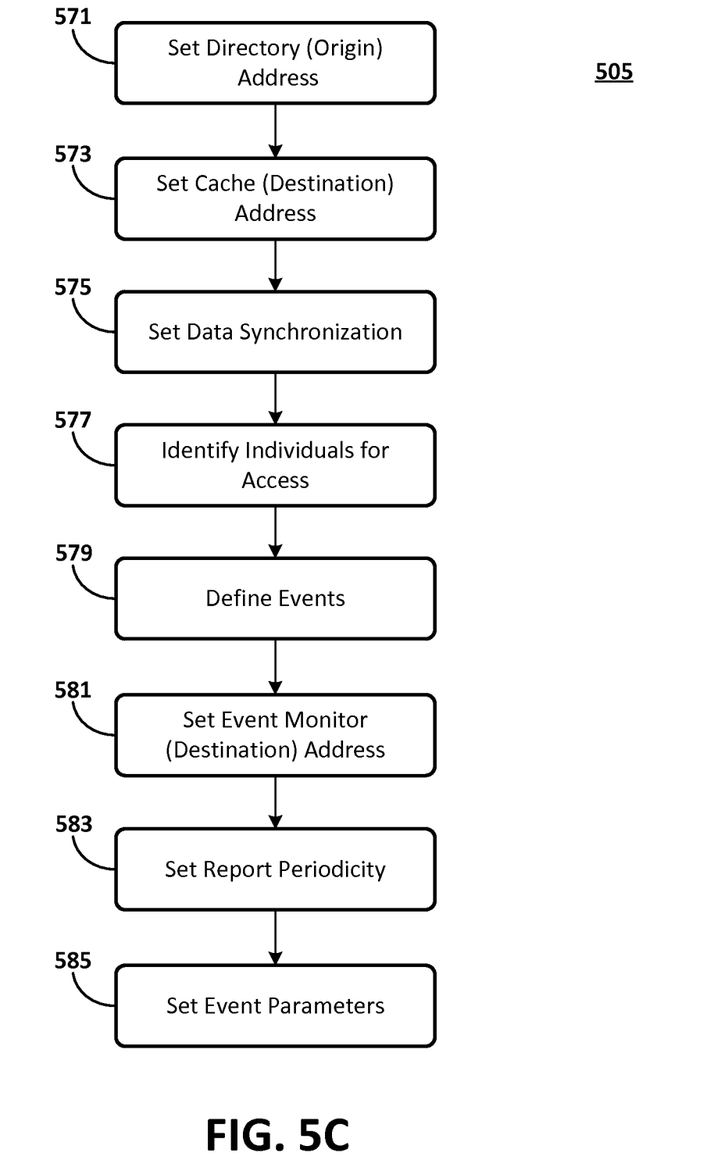

FIGS. 5A-5C are flowcharts illustrating example methods of the system of FIGS. 1A-1C and the components of FIGS. 2-4.

FIGS. 5A and 5B illustrate example method 500, which begins in block 505 when the access controller 100 receives credential and policy directory 200 and event monitoring workstation 300 information (e.g., URLs of these devices/systems) and the information is used to configure the access controller 100. In an access control system having multiple access controllers 100, the configuration of a first (parent) access controller may be copied to the remaining (child) access controllers.

In block 510, the directory information is used to acquire credential and policy information for one or more individuals who may require access to the enclosed area 12.

In block 515, the thus-acquired credential and policy information is loaded into the local cache of each access controller 100.

In block 520, an access controller 100 receives an access request to allow an individual 42 to enter (or leave) the enclosed area 12 (through a specific door 22). The access request may be based on data read from the credential 40

In bock 525, information from the received request is used in the access controller 100 to retrieve credential and policy information in the cache 103 for the individual 42, and the retrieved information then is compared to that contained in the access request.

In block 530, the access controller 100 determines if the comparison indicates a sufficient match so as to allow the individual 42 access to the enclosed area 12. For example, each item of information retrieved from the cache 103 may be required to match exactly that read from the certificate 40. In block 530, if a match is determined, the method 500 moves to block 535. If no match is determined, the method 500 moves to block 545.

In block 535, the access controller 100 sends an unlock signal to the door system 20. In block 540, the access controller 100 then monitors operation of the door system 20 to determine if the door 22 opens (to admit the individual 42, and then closes and locks).

In block 545, if implemented in the system 10, the access controller 100 sends the access request to the directory 200, which uses its own internal processing to determine if the information received from the credential 40 matches that in the directory 200 for the individual 42.

In block 550, the access controller 100 receives a signal from the directory 200 indicating either a match or no match. If a match is indicated, the method 500 moves to block 540. If no match is indicated, the method 500 moves to block 555 and the access controller 100 denies access to the individual 42.

In block 560, following the operation of block 540, the access controller 100 receives event information from the door system 20, formats the event information into events, and sends the events to the event monitoring workstation 300.

Following either block 555 or 560, the method 500 moves to block 565 and ends.

FIG. 5C is a flowchart illustrating an example aspect of the process of block 505 of FIG. 5A, specifically for configuring an access controller 100. In FIG. 5C, method 505 begins in block 571 when the system operator uses the interface 160 to set the directory (origin) address from which the access-controller 100 will acquire credential and policy information for individuals 42 requiring access to the enclosed area 12. In block 573, the destination address (i.e., the address of the cache 103) is set. In block 575, a synchronization time is set. In block 577, the access controller receives an indication of specific individuals 42 whose credentials and related information are to be entered into the cache 103.

In block 579, the access controller receives a definition of events to be monitored by the access controller 100. The events may be pre-defined or may be established and defined by the system operator using, for example, the interface 160. In block 581, the access controller 100 receives the destination address(es) of the event monitor(s) that will receive the event information. In block 583, the access controller 100 receives a required reporting interval or periodicity. Finally, in block 585, the access controller 100 receives parameters defining what information is to be provided or recorded with each event. The method 505 then ends.

Certain of the devices shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 5A-5C. The disclosed devices, components, and systems contemplate using or implementing any suitable technique for performing the steps illustrated. Thus, FIGS. 5A-5C are for illustration purposes only and the described or similar steps may be performed at any appropriate time, including concurrently, individually, or in combination. In addition, steps in the flowcharts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A processor-implemented access control method, comprising:

at the processor physically located at an access controlled area including a door, receiving credential and policy directory information to configure an access controller to allow self-provisioning of the access controller through periodic, automated query of the credential and policy directory by the access controller;

acquiring from the credential and policy directory, using the processor, credential and policy information for one or more individuals who may require access to the access controlled area;

storing in a local cache accessible by the processor, the acquired credential and policy information;

periodically requesting, by the processor, a credential and policy information update from the credential and policy directory;
receiving, at the processor, the credential and policy information update in response to the periodic requesting;
updating the local cache based on the credential and policy information update;
receiving, at the processor, an access request to allow an individual among the one or more individuals access to the access controlled area;
comparing, by the processor, the access request to the credential and policy information in the local cache;
when the comparison indicates a match, granting the individual access to the access controlled area; and
configuring the access controller to monitor for and collect events related to the door, wherein types of the collected events include the door open, the door closed, the door stuck open, the door locked, and the door unlocked.

2. The method of claim 1, wherein the access controlled area is an enclosed area.

3. The method of claim 2, wherein the enclosed area comprises multiple access controllers, and wherein configuring the access controller comprises:
configuring a first access controller through a user interface; and
automatically replicating the configuration in each of the other access controllers.

4. The method of claim 2, wherein the directory information comprises a URL of the directory.

5. The method of claim 2, wherein the access request is received at a credential reader of the enclosed area, the credential reader reading a credential of the individual, and wherein the access request comprises credential and policy information from the credential to compare to the credential and policy information in the local cache.

6. The method of claim 2, wherein the comparison requires an exact match between information in the access request and corresponding credential and policy information in the local cache.

7. The method of claim 2, further comprising unlocking the an access door to the enclosed area to grant access to the enclosed area.

8. The method of claim 2, further comprising:
receiving, by the processor, an address of an event monitor; and
receiving event definition information defining the collected events; and
wherein configuring includes configuring the access controller to monitor for and collect the collected events according to the received event definition information.

9. The method of claim 8, further comprising:
configuring the access controller to buffer and report the collected events to the event monitor.

10. The method of claim 9, wherein the processor receives an address of each of a plurality of event monitors, and wherein the method comprises simultaneously sending the collected events to multiple ones of the plurality of event monitors.

11. The method of claim 1, wherein the access request is a request to access a resource in the access controlled area.

12. The method of claim 11, wherein the resource is a logical resource.

13. The method of claim 11, wherein the access controller self-provisions access to the resource based on a location of the individual with respect to the resource.

14. The method of claim 1, wherein when the comparison indicates no match, the method comprises sending the access request to the credential and policy directory to determine a match.

15. The method of claim 1, wherein the updating is performed continually in real-time.

16. A system for controlling access by individuals to an area, comprising:
a processor physically located at the area, the area including a door; and
an access controller embodied on a computer-readable storage medium, the access controller comprising machine instructions that when executed by the processor, causes the processor at least to:
configure the system to receive:
credential and policy directory information, from a remote directory, to allow self-provisioning of the access controller through periodic query of the credential and policy directory by the access controller; and
credential and policy information, from the credential and policy directory, for one or more individuals who may require access to the area,
store in a local cache accessible by the processor, the received credential and policy directory information of the credential and policy directory and the credential and policy information of the one or more individuals,
periodically request a credential and policy information update from the credential and policy directory;
receive, at the processor, the credential and policy information update in response to the periodic request;
update the local cache based on the credential and policy information update;
receive an access request to allow an individual among the one or more individuals access to the area;
compare the access request to the credential and policy information in the local cache;
when the comparison indicates a match, grant the individual access to the area; and
configure the system to monitor for and collect events related to the door, wherein types of the collected events include the door open, the door closed, the door stuck open, the door locked, and the door unlocked.

17. The system of claim 16, wherein the area comprises multiple access controllers, and wherein, when the system is configured, the processor:
configures a first access controller through a user interface; and
automatically replicates the configuration in each of the other access controllers.

18. The system of claim 16, wherein the directory information comprises a URL of the directory, and wherein the directory and the processor communicate using TCP/IP protocols.

19. The system of claim 16, wherein the access request is received at a credential reader of the area, the credential reader reading a credential of the individual, and wherein the access request comprises credential and policy information from the credential to compare to the credential and policy information in the local cache.

20. The system of claim 16, wherein the collected events are based on pre-defined event definition information.

21. The system of claim 20, further comprising:
a buffer to store the collected events.

22. The system of claim 21, wherein the processor receives an address of each of a plurality of event monitors, and wherein the processor simultaneously sends the collected events to multiple ones of the plurality of event monitors.

23. A processor-implemented method for configuring an access controller, the access controller controlling access by an individual to an asset in an access controlled area, the method comprising:
receiving, by the processor physically located at the access controlled area, a credential and policy directory address from which the processor obtains credential and policy information for individuals requiring access to the asset;
receiving a destination address for the credential and policy information;
establishing a periodicity for acquiring the credential and policy information;
acquiring the credential and policy information for the individuals requiring access to the asset;
automatically updating the credential and policy information for the individuals requiring access to the asset at the established periodicity; and
wherein the asset is located in either a first defined physical area or a second defined area within the access controlled area, and wherein an individual among the individuals requiring access is identified as located in the first defined area based on a first read of a credential of the individual and is identified as located in the second defined area based on a second read of the credential.

24. The method of claim 23, wherein the asset is a logical asset, and wherein the processor provides a first access level to the logical asset in the first defined physical area and a second access level higher than the first access level in the second defined area.

25. The method of claim 24, wherein the individual is granted access to the logical asset at the second access level when the individual is identified as located in the second defined area.

* * * * *